No. 658,726. Patented Sept. 25, 1900.
P. NAEF.
PROCESS OF CRYSTALLIZING SOLIDS FROM LIQUIDS.
(Application filed Mar. 29, 1900.)
No Model.
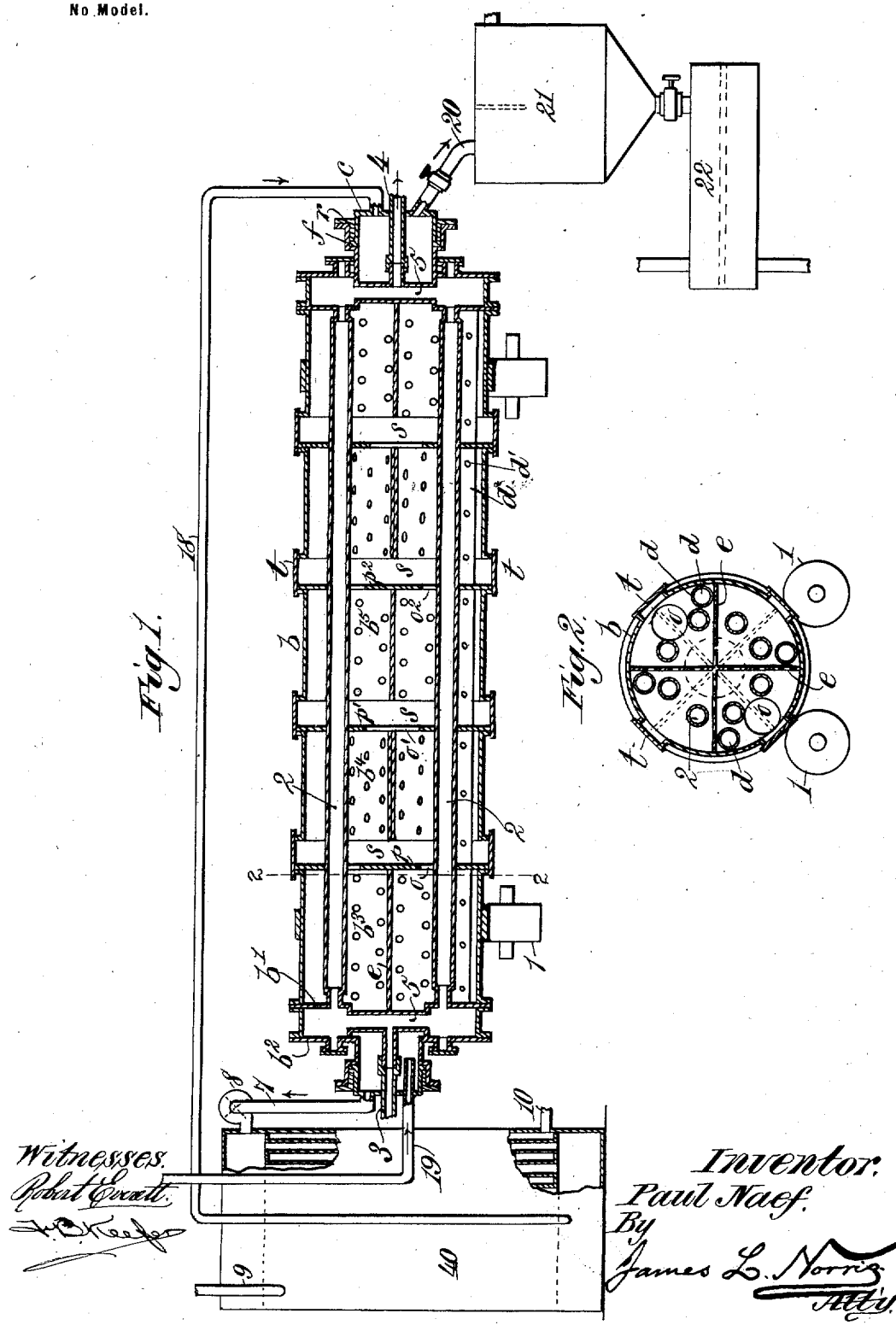
Witnesses.
Robert Everett.
Inventor.
Paul Naef.
By James L. Norris
Att'y.

UNITED STATES PATENT OFFICE.

PAUL NAEF, OF NEW YORK, N. Y.

PROCESS OF CRYSTALLIZING SOLIDS FROM LIQUIDS.

SPECIFICATION forming part of Letters Patent No. 658,726, dated September 25, 1900.

Original application filed February 5, 1900, Serial No. 3,998. Divided and this application filed March 29, 1900. Serial No. 10,665. (No specimens.)

*To all whom it may concern:*

Be it known that I, PAUL NAEF, a citizen of the Republic of Switzerland, residing at New York city, in the county of New York and State of New York, have invented new and useful Improvements in the Process of Crystallizing Solids from Liquids, of which the following is a specification.

This invention relates to a process of crystallizing solids from liquids; and it consists in bringing the liquid into contact with a cold permanent gas that is repeatedly cooled alternately with its passage through said liquid, the said gas being caused to circulate through said liquid in a reverse direction to the flow of the liquid, simultaneously cooling the liquid from the exterior by means independent of said liquid and gas, and finally separating crystals from the liquid, as hereinafter more fully described.

My improved process may be carried out with various forms of apparatus adapted to the circulation of a liquid and a cold gas in contact with each other and preferably in reverse directions, and in the annexed drawings I will illustrate but one form of apparatus adapted to the purposes of my improved process.

Figure 1 is a part sectional view of the apparatus. Fig. 2 is a transverse section of a portion of the apparatus on the line 2 2 of Fig. 1.

My present invention is a division of the process or method for producing alkali and chlorin described in my application, Serial No. 3,998, filed February 5, 1900, and is applicable to the crystallization of various solid substances from liquids.

The liquor to be treated is subjected to a low temperature in a cylinder or chamber $b$ for the separation of the solid matter to be crystallized therefrom. The chamber $b$ is preferably constructed in cylindrical form and is mounted on rollers 1 to be readily revolved by any suitable means, thereby agitating together the liquor and gas introduced into said chamber and which flow through the same in opposite directions and in intimate contact with each other. Instead of revolving this chamber, however, it may be provided internally with any suitable agitating apparatus.

As shown in the drawings, 2 2 represent cooling-pipes, arranged in the cylinder or chamber $b$ and which terminate at each end of the cylinder in plates $b'\ b'$. The pipes 2 may be secured to the plates $b'\ b'$ by means of flanges or by the method usually employed in locomotive-boilers. There is an annular space between each of the plates $b'\ b'$ and the end plates $b^2\ b^2$ of the cylinder, with which spaces the pipes 2 communicate.

3 is the cooling-fluid-inlet pipe.

4 is the cooling-fluid-outlet pipe and 5 5 are branch pipes, respectively connecting the pipes 3 and 4 with the annular spaces $a$ between the plates $b'\ b'$ and $b^2\ b^2$. The cooling fluid enters by the pipe 3, passes through the pipes 2 2, and leaves by the pipe 4, as indicated by the arrows. Each of the end plates $b^2$ is preferably provided with a flange $f$, into which fits a stationary cover $c$, provided with a rim. A suitable packing is to be placed between the flange $f$ and the cover $c$ and an adjustable ring $r$ is provided to hold said packing in position.

The liquor to be treated enters the cylinder or chamber $b$ through a pipe 19, and the liquor containing the crystallized solids leaves the opposite end of the chamber or cylinder $b$ by the pipe 20. The cooling-gas to be brought into contact with the liquor under treatment enters the cylinder $b$ through the pipe 18 and leaves through the pipe 7.

The interior of the cylinder may be divided into sections $b^3\ b^4\ b^5$, provided with perforated longitudinally-arranged partitions $e$, which may sometimes consist of wire-gauze. Between these sections are open spaces $s$, which are accessible for cleaning purposes through suitable manholes $t$, as shown. The said longitudinally-arranged partitions $e$ of each section are preferably arranged in radial offset positions or at an angle to the longitudinal partitions of the adjacent section or sections, as shown in Fig. 2, in such manner that the longitudinal partitions of one section will alternate with the longitudinal partitions of the adjacent section. This arrangement insures a very intimate contact of the liquor and the cold gas in their passage through the cylinder or chamber $b$. Vertical cross-partitions $p$ $p'$ $p^2$, respectively, provided with openings $o$ $o'$ $o^2$, are arranged in the cylinder $b$ in such manner as to cause the cold gas to pass through the cylinder in a zig-zag path.

For the purpose of lifting the liquor and showering it onto the perforated longitudinally-arranged partitions $e$ as the cylinder revolves pipes $d$ $d$, provided with openings $d'$ $d'$, are arranged longitudinally within the said cylinder or chamber $b$. These pipes $d$ $d$ may be formed on or adjacent to the longitudinal partitions $e$ or they may be fastened to the cylinder, and the said pipes may extend throughout the length of the cylinder, or, if the cylinder is divided into sections, the said pipes may also be formed in corresponding sections. The perforated pipes $d$ are so arranged that the liquor lifted by them is discharged through their perforations onto the perforated longitudinally-arranged partitions $e$ during the revolution of the cylinder. Obviously if the cylinder or chamber $b$ is mounted in a stationary or fixed position the longitudinally-arranged partitions $e$ would be omitted, and in that case any suitable agitating mechanism would be provided within the cylinder or chamber.

For the purpose of cooling the gas that is to be brought into contact with the liquor being treated and to provide for the circulation of this gas there is provided a gas-cooler 40, which may be of any suitable construction, preferably comprising a suitable casing having a system of cooling-pipes therein. The cooled gas is drawn from the lower part of this cooler through the pipe 18, that leads into one end of the cylinder or chamber $b$, and after passing through the cylinder $b$ and in contact with the liquor therein the gas leaves the other end of said cylinder through the pipe 7 and is discharged therefrom into the upper part of said cooler, a fan 8 being provided to cause a continuous circulation of gas through the cylinder $b$ and gas-cooler 40 in such manner that gas cooled to a very low temperature will be continuously circulated through the liquor under treatment. The gas is cooled in the cooler 40 by circulating a cooling fluid through the space surrounding the pipes in said cooler. This cooling fluid enters the cooler through a pipe 9 and leaves the said cooler through a waste-pipe 10.

By referring to Fig. 2 it will be seen that the liquor under treatment passes through the cylinder $b$ in a reverse direction to the passage of the cold gas through said cylinder or chamber and in contact with said liquor, and as the liquor is thus brought into intimate contact with the cold gas the crystallization of the solids contained in said liquor is very rapid and the apparatus has a large capacity without necessarily occupying much space. The liquor that has been thus treated in the cylinder or chamber $b$ leaves said cylinder or chamber through the pipe 20 and is thereby conducted to a settling-tank 21, which may be fitted with an agitator. This liquor that flows from the chamber or cylinder $b$ will hold in suspension some of the crystallized solids, and is therefore drawn from the tank 21 into a suitable filter 22, where it is washed for the separation of the crystals. Whenever deemed necessary, access may be had to the interior of the cylinder or chamber $b$ through its manholes $t$ to remove any deposit of crystals in said cylinder or chamber, and these crystals or separated solids may be washed or otherwise further treated, as desired.

In the apparatus shown in the drawings the crystals leave the apparatus suspended in the liquor and are separated from the liquor in the settling-tank. The liquor flows continuously from the latter. The crystals are withdrawn in the form of a sludge from the conical bottom of the settling-tank and are washed and dried on a filter or other suitable apparatus. The crystals are thus continuously removed from the liquor.

By causing a cooling fluid to flow continuously through the cooling-pipes 2, the liquor that is under treatment in the chamber $b$ is constantly cooled from the exterior, as it were, while at the same time it is subjected to the action of a cold gas that is passed through it in a reverse direction to the flow of the liquid through the crystallizing-chamber.

The method can be used for the treatment of various substances and is of special advantage if cooling from the outside is difficult through the deposition of crust and crystals on the cooling-surface.

If solid crystalline masses have to be produced, it is of advantage to keep the apparatus at such a temperature that a sludge containing the crystals in suspension leaves the same. This sludge is run into vessels and here complete solidification takes place by further cooling or the crystals are separated from the liquor in a suitable press, whereby solid blocks are produced.

If large crystals are to be produced the liquor is not agitated, but is moved very slowly. The same liquor may be circulated through the apparatus several times by suitable pumps.

The crystallizing vessel can be so arranged that the crystals as they are formed settle into a lower part, from which they can be withdrawn.

Having described my invention, what I claim is—

The method of crystallizing solids from a liquid, which consists in causing said liquid to flow in one direction, continuously circulating a cold permanent gas through said liquid in a reverse direction to the flow of the liquid, repeatedly cooling said gas alternately with its passage through said liquid, simultaneously cooling the liquid from the exterior by means independent of said liquid and gas, and separating from said liquid, by settling and filtering, a clear liquor and a sludge containing crystals, as specified.

In testimony whereof I have hereunto set my hand in presence of two subscribing witnesses.

PAUL NAEF.

Witnesses:
C. E. LANGDON,
GERRIT SMITH.